United States Patent [19]
Garrett et al.

[11] Patent Number: 5,325,291
[45] Date of Patent: Jun. 28, 1994

[54] METHOD OF VERIFYING INSURANCE ON REGISTERED VEHICLES

[75] Inventors: Thomas L. Garrett, 202 Lake Oshawno, Carbondale, Kans. 66414; Michael Tuttle, Topeka, Kans.

[73] Assignee: Thomas L. Garrett, Carbondale, Kans.

[21] Appl. No.: 965,154

[22] Filed: Oct. 22, 1992

[51] Int. Cl.[5] ............................................. G06F 15/21
[52] U.S. Cl. ..................................... 364/401; 364/409
[58] Field of Search ............. 364/401, 402, 409, 413.01

[56] References Cited

U.S. PATENT DOCUMENTS

| | | | |
|---|---|---|---|
| 3,676,851 | 7/1972 | Eastman . | |
| 4,567,359 | 1/1986 | Lockwood . | |
| 4,831,526 | 5/1989 | Luchs et al. | 364/401 |
| 4,970,655 | 11/1990 | Winn et al. . | |
| 4,989,144 | 1/1991 | Barnett | 364/409 |

*Primary Examiner*—Robert A. Weinhardt
*Attorney, Agent, or Firm*—Michael Yakimo, Jr.; D. A. N. Chase

[57] ABSTRACT

A method for determining the presence and/or absence of automobile insurance on State registered vehicles utilizes registered vehicle records and insurance record databases as provided by the State and private sectors. The records contain information indicating the presence of insurance on particular vehicles. A computer controlled by a computer software program compares preselected data fields in each vehicle record with corresponding data in the insurance records. Similar data field comparison(s) is (are) made between the records of the insurance database and the vehicle database. Records lacking matching data are moved to an exceptions database for further verification and handling. Vehicle records not having a matching insurance record are checked on a weekly basis to determine if a corresponding insurance record has been entered subsequently into the insurance database. Vehicle records lacking insurance records are indicative of no vehicle insurance and are delivered to authorities for further actions. Various cross checks of other data fields between the records may be utilized to check the accuracy of the recorded data entered therein.

19 Claims, 20 Drawing Sheets

STATE RECORD
~201

| VARIABLE DATA FIELD NUMBER | NAME |
|---|---|
| 1 | = dl_num ~220 |
| 2 | = tag_number ~230 |
| 3 | = tag_expire |
| 4 | = name |
| 5 | = ss_number ~240 |
| 6 | = sex |
| 7 | = dob |
| 8 | = address |
| 9 | = city |
| 10 | = state |
| 11 | = zip_code |
| 12 | = county |
| 13 | = year |
| 14 | = make |
| 15 | = model |
| 16 | = vid_number ~210 |
| 17 | = inscompany |
| 18 | = policy_num ~250 |
| 19 | = effective |
| 20 | = pol_expire |
| 21 | = lienholder |
| 22 | = address2 |
| 23 | = violation1 ~260 |
| 24 | = violation2 ~270 |
| 25 | = violation3 ~280 |
| 26 | = violation4 ~290 |

FIG. 3

INSURANCE RECORD

| VARIABLE DATA FIELD NUMBER | NAME |
|---|---|
| 1 | = dl_num ~ 420 |
| 2 | = tag_number ~ 430 |
| 3 | = tag_expire |
| 4 | = name |
| 5 | = ss_number ~ 440 |
| 6 | = sex |
| 7 | = dob |
| 8 | = address |
| 9 | = city |
| 10 | = state |
| 11 | = zip_code |
| 12 | = county |
| 13 | = year |
| 14 | = make |
| 15 | = model |
| 16 | = vid_number ~ 410 |
| 17 | = inscompany |
| 18 | = policy_num ~ 450 |
| 19 | = effective |
| 20 | = pol_expire |
| 21 | = lienholder |
| 22 | = address2 |

FIG. 4

Search Master-Index Exit Browse

Insurance Master Records

| Tag Number | | BHA795 |
|---|---|---|
| | Tag Number | |
| | Policy Number | |
| | SS Number | |
| | Vehicle ID Number | 1B3BE36K4HC196100 |
| | Insured's Name | ACCERBY JOAN H |
| | Address | 666 W 3RD APT 5G |
| | City | WICHITA |
| | Zipcode | 66604 |
| | DL Number | |
| | Year | 82 |
| | Make | NISSAN |
| | Model | TAURUS |
| | Lienholder | TOM'S BANK |
| | Address | 9876 W 48TH JOHNSTOWN, NEW HAMPSHIRE 768 |
| | State | KS |
| | Tag Number | BHA795 |
| | Policy Number | |
| | SS Number | |

BHA795
BHA795
BHA938
BHA817
BHA870
BHA803
BHA812
BHA822
BHA833
BHA839
BHA845
BHA858
BHA879
BHA872
BHA946
BHA884
BHA887

Master Index [INVIDNUM]

FIG. 6

```
┌─Mark Files to Clear──────────────┐
│ [ ] Title Number Exceptions    [     0] │
│ [N] Tag Exceptions             [     8] │
│ [N] VID Exceptions             [    23] │
│ [ ] Policy Number Exceptions   [     0] │
│ [ ] Social Security Exceptions [     0] │
│                                         │
│ [ ] Duplicate Records          [     0] │
│ [N] State Master Records       [   102] │
│ [N] Insurance Master Records   [    98] │
│ [N] Log on / Log off files     [ 1,563] │
└─────────────────────────────────────────┘
Exit
```

FIG. 7

METHOD OF VERIFYING INSURANCE ON REGISTERED VEHICLES

BACKGROUND OF THE INVENTION

This invention relates to a method for determining the presence, maintenance and/or absence of automobile insurance on registered vehicles.

Drivers lacking insurance will cause the financial burden of a vehicle accident to fall either on the other driver or the driver's insurance company. These accident costs will then be passed onto all drivers in the form of increased premiums for uninsured motorist coverage.

States have attempted to address this insurance problem by requiring the motorists at the time of paying for their vehicle license plates/tags to provide proof of vehicle insurance for the associated vehicles. However, once the license plate is purchased there is no assurance that the motorist will not subsequently terminate the insurance on that vehicle but continue to operate the registered vehicle in the State with no proper insurance. There is no system in place allowing the State to timely ascertain if such an event occurs. Thus, it is desired to have a system which efficiently monitors the acquisition and maintenance of insurance during ownership and/or operation of the State-licensed vehicle.

In response thereto a system has been invented effectively implemented by computer software and hardware, which monitors the presence and/or absence of vehicle insurance on State registered vehicles. The system utilizes first input data from the public sector, i.e. the State, and second input data from the private sector, i.e. insurance companies. This data is formatted into records and stored in separate databases so as to provide vehicle and insurance data records associated with the registered vehicles and the vehicle insurance thereon.

A State vehicle database comprising records of preselected vehicle and individual information is provided by the State in a predetermined data field format. A second insurance database, as provided by the insurance companies, comprises records identifying individual information as well as the insurance for particular vehicles. Each insurance record preferably contains variable data fields corresponding to the data fields in the vehicle record database. Selectable data fields of the records of each database are compared in an attempt to match the selected data fields in each record of the State vehicle database to selected data fields in each insurance record in the insurance database. A similar reverse comparison is made to match selected data fields in each insurance record to the vehicle records in the State database. If no match is found the information in either the vehicle or insurance records is moved to an exceptions database for further comparison. Records in the exceptions database are flagged to indicate no comparable insurance record has been found. These records are further compared on a subsequent weekly basis to allow for time delays in the update of records in the insurance database. If no match is found for the State vehicle record in the insurance database after a predetermined time period, such as four weeks, the vehicle record is finally flagged as having no insurance for subsequent follow-up by an appropriate government agency. The system also allows further comparisons to be made between the variable data fields in the two database records to ascertain the accuracy of other vehicle and/or insured information.

It is therefor a general object of this invention to provide a system for determining the presence or absence of insurance on State registered vehicles.

Another object of this invention is to provide a system, as aforesaid, which utilizes databases comprised of State provided vehicle records and insurance company records for said insurance determination.

A further object of this invention is to provide a system, as aforesaid, which allows for preselected data to be compared between the State and insurance record databases in a manner to ascertain the accuracy of the information in the databases.

Still a further object of this invention is to provide a system, as aforesaid, which compensates for delay in the recordation of records in the insurance database.

A further particular object of this invention is to provide a system, as aforesaid, which enables the user to identify the presence of data information errors made in the creation of vehicle and/or insurance records.

Other objects and advantages of this invention will become apparent from the following description taken in connection with the accompanying drawings, wherein is set forth by way of illustration and example, an embodiment of this invention.

BRIEF DESCRIPTION OF THE DRAWINGS

FIG. 3 is a layout of one form of vehicle database record with the variable data fields therein;

FIG. 4 is a layout of one form of insurance database record with the variable data fields therein;

FIG. 6 is a layout of a screen displayed on the terminal allowing the user to view data in an insurance record; and FIG. 7 is a layout of an information screen displayed on the terminal telling the user the number and type of exceptions found in the provided records.

DESCRIPTION OF THE PREFERRED EMBODIMENT

Figure 1:
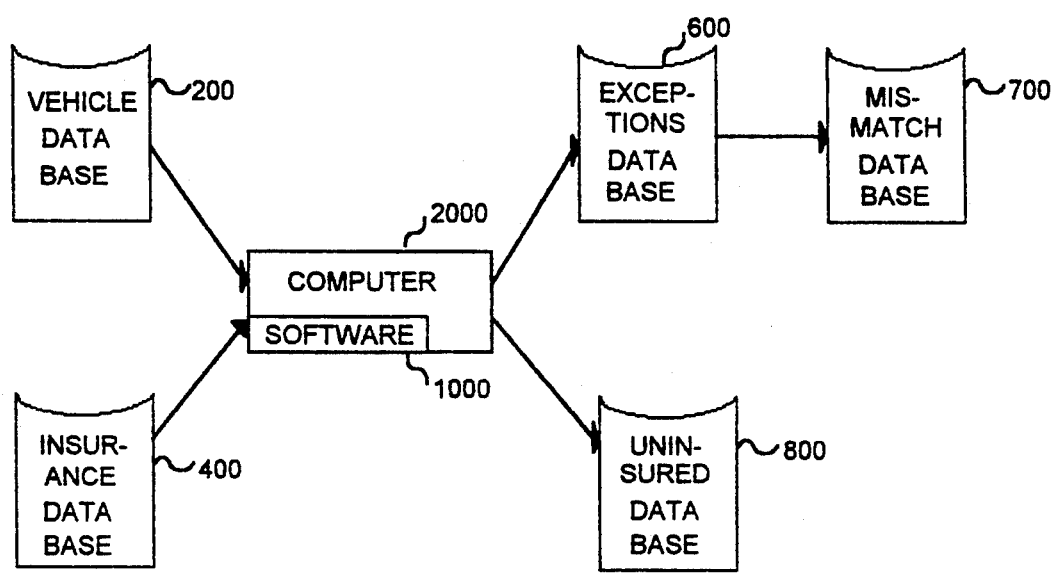
FIG. 1 is a diagrammatic view of the system architecture of the vehicle insurance verification system.
Figure 2A:
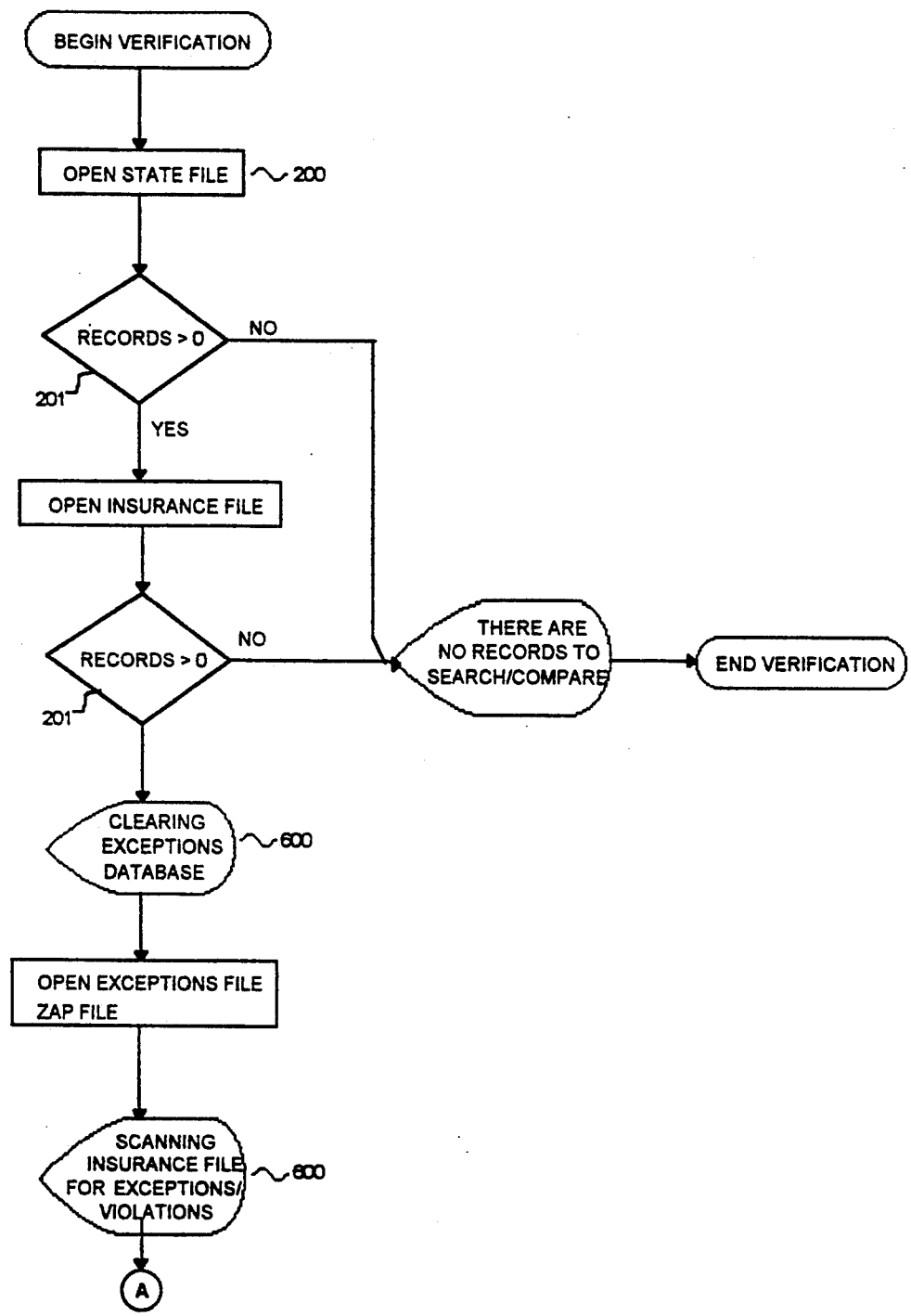
FIGS. 2A–2N are flow charts generally designating the process flow of the system.
Figure 2B:
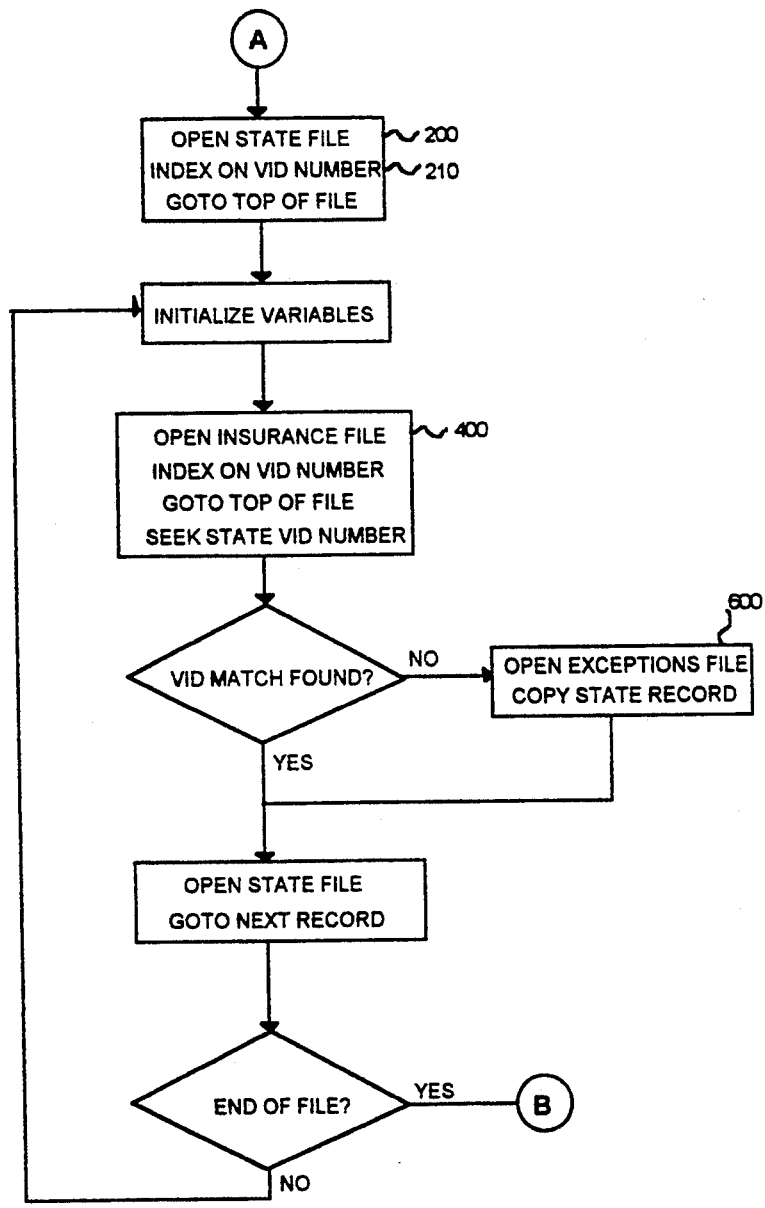
Figure 2C:
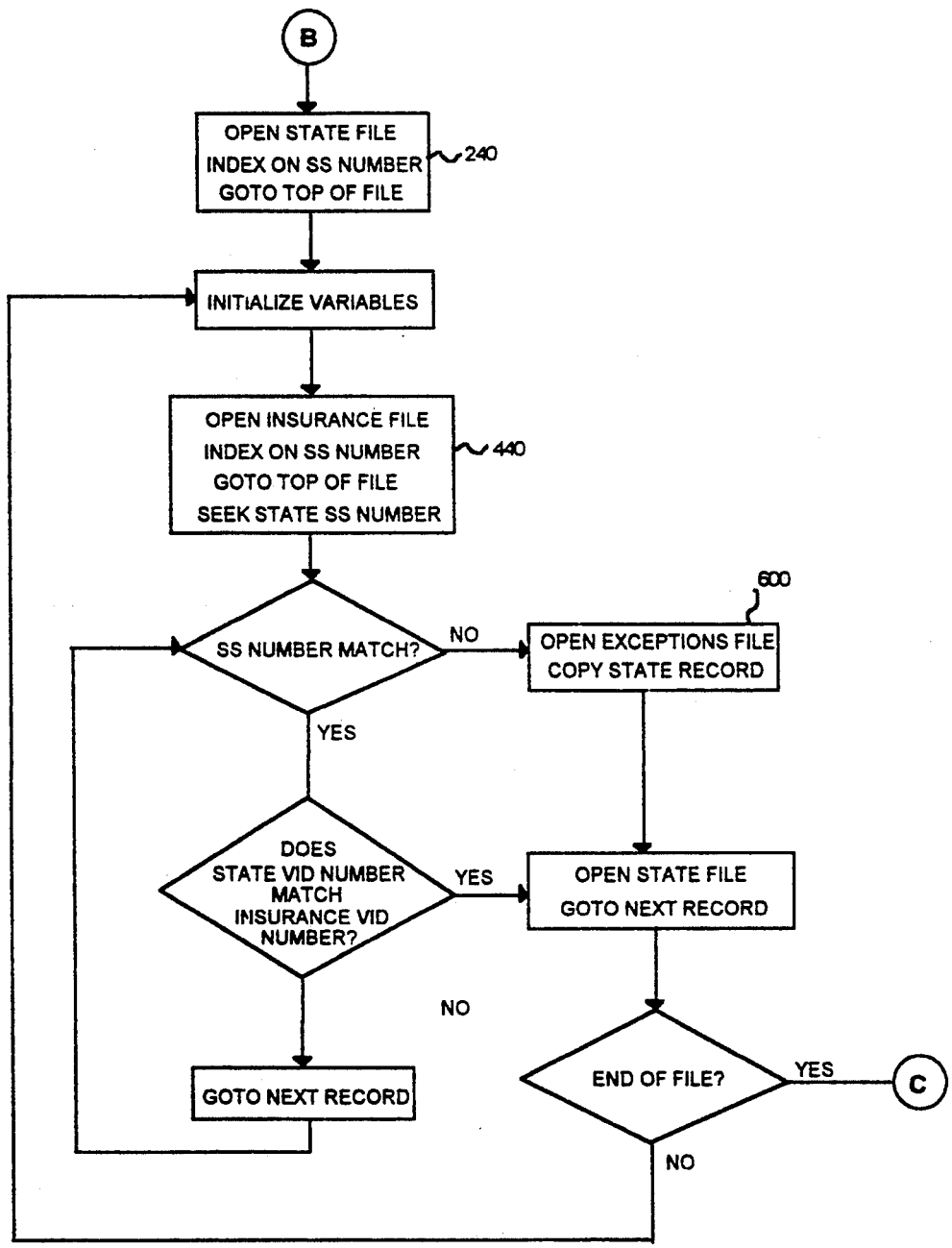
Figure 2D:
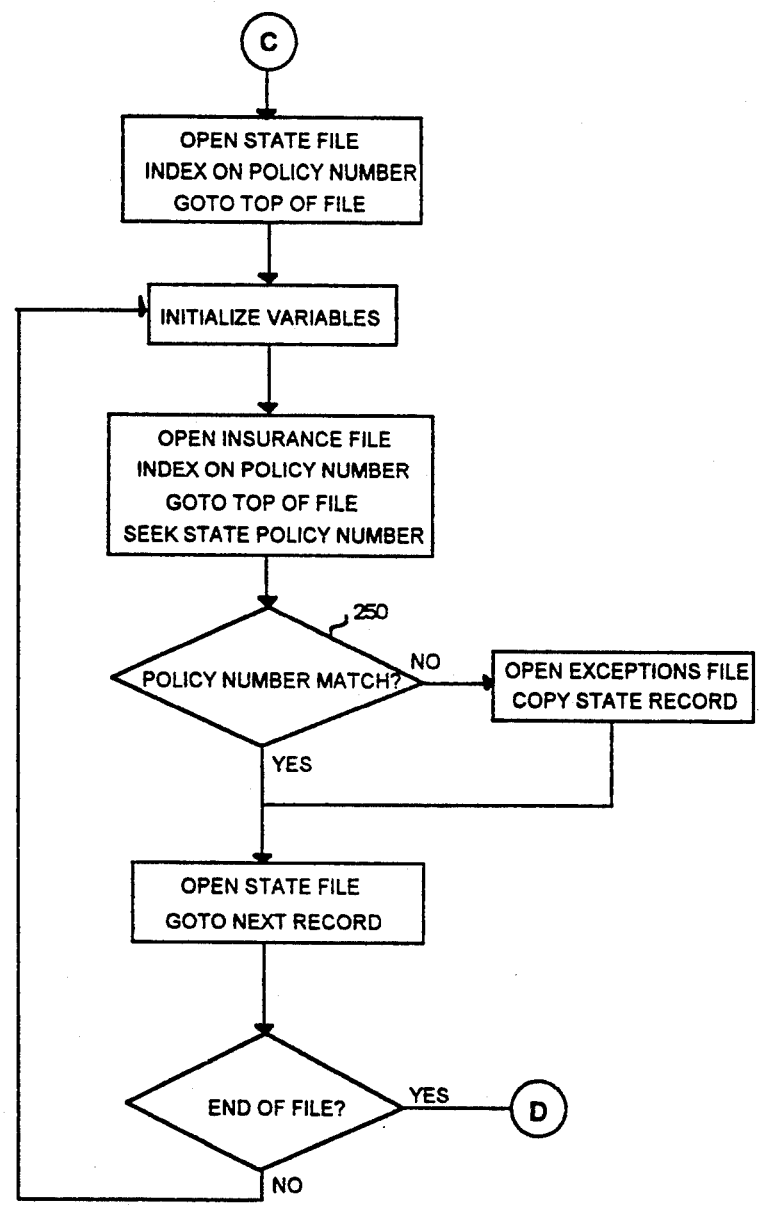
Figure 2E:
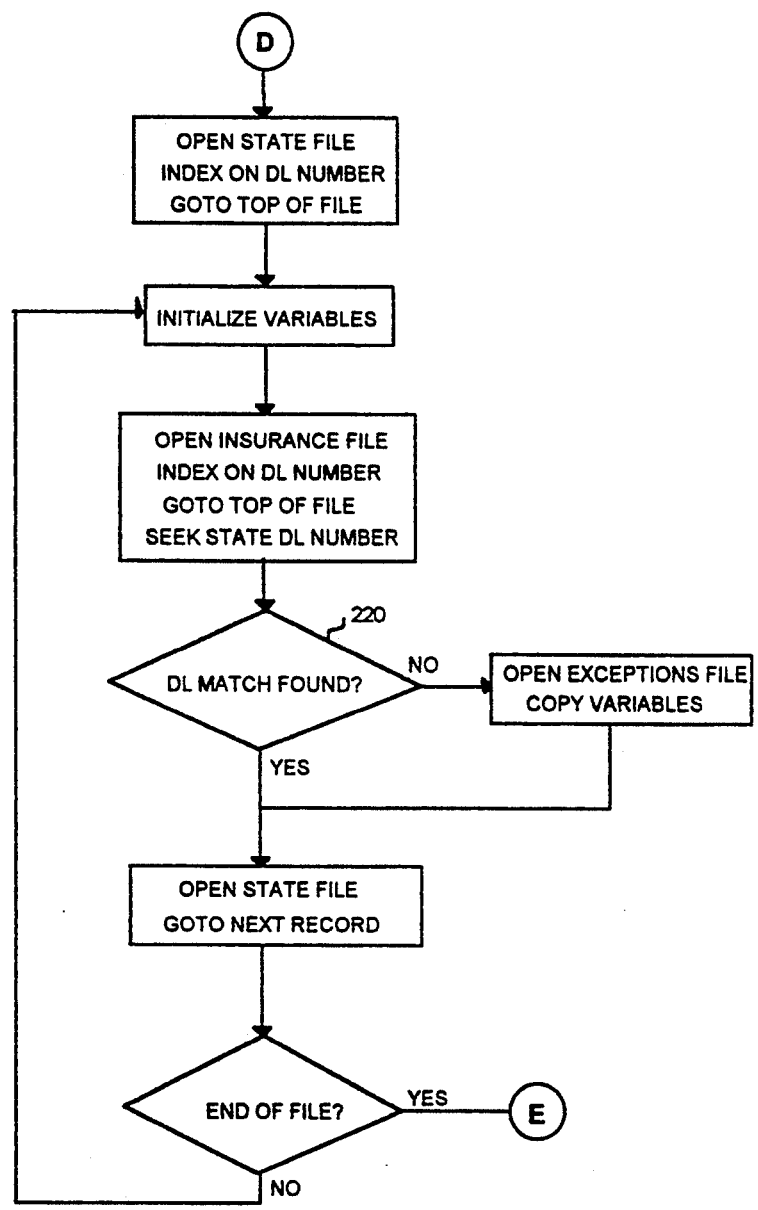
Figure 2F:
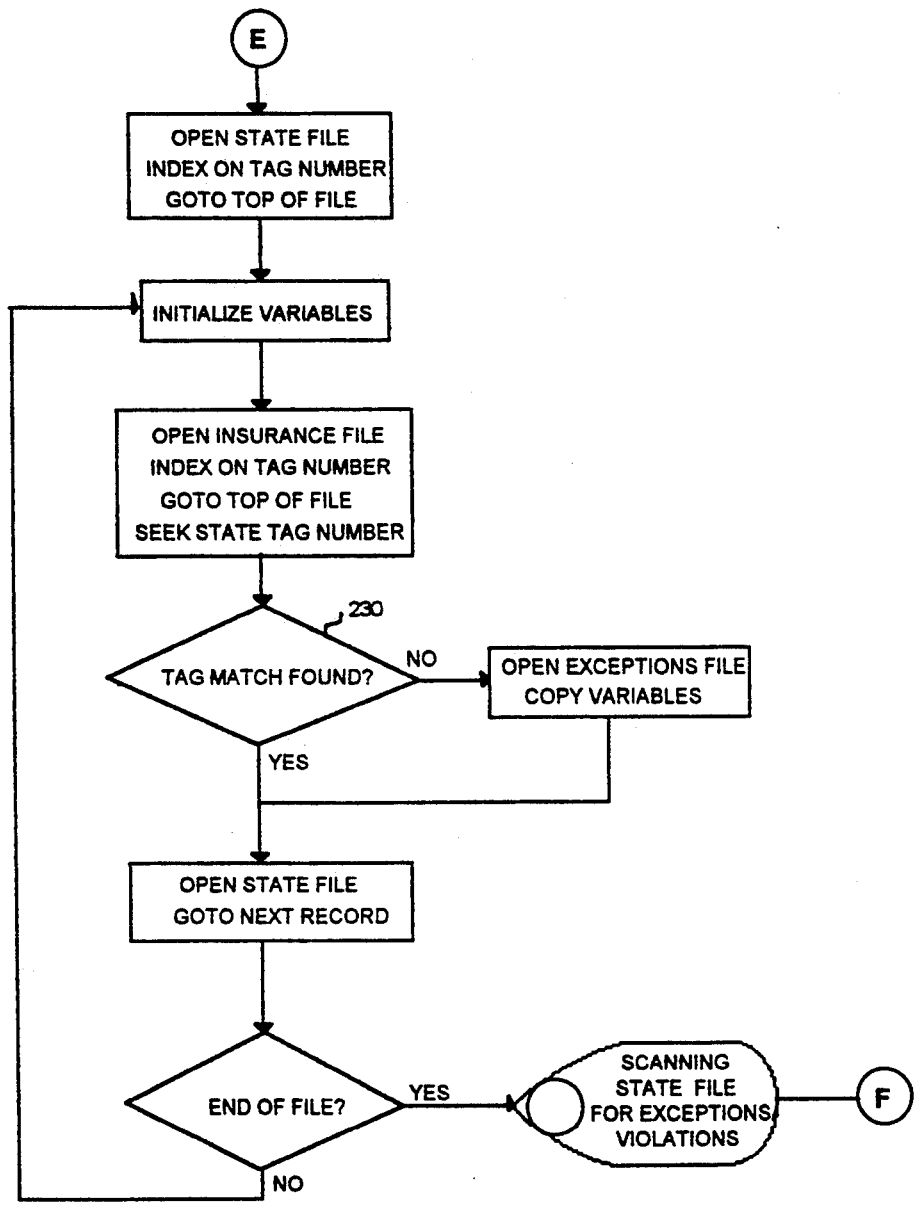
Figure 2G:
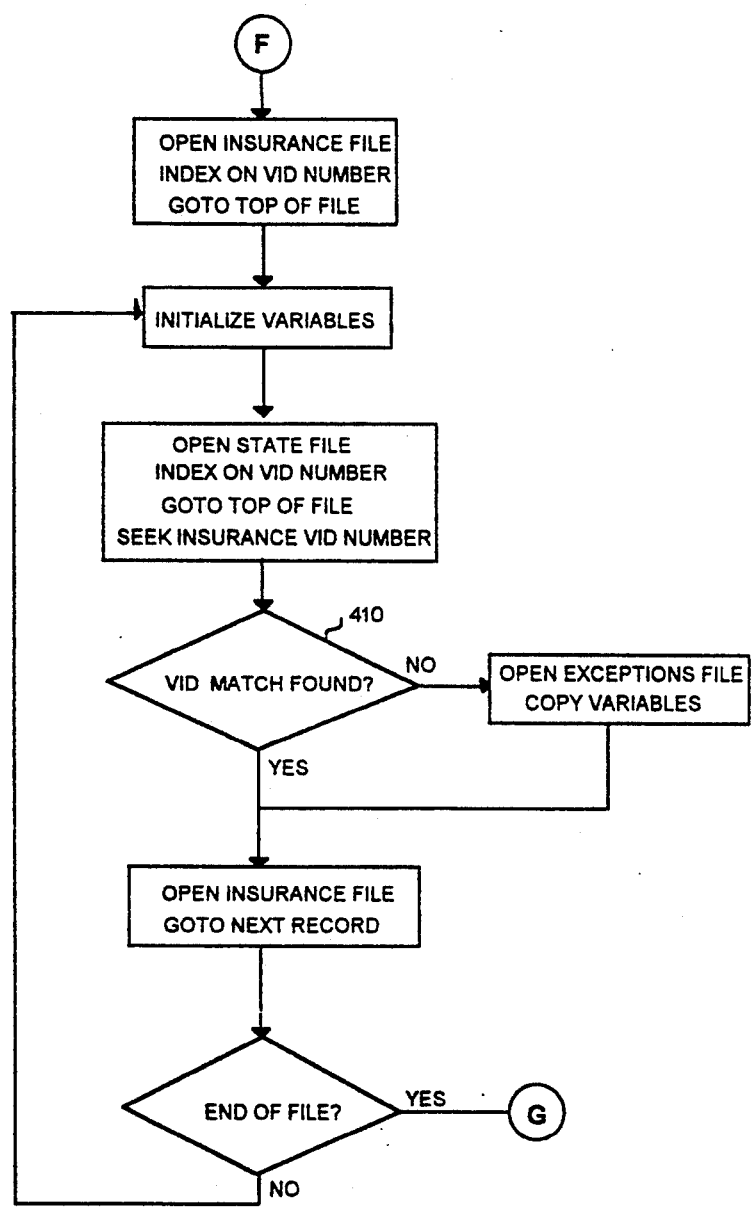
Figure 2H:
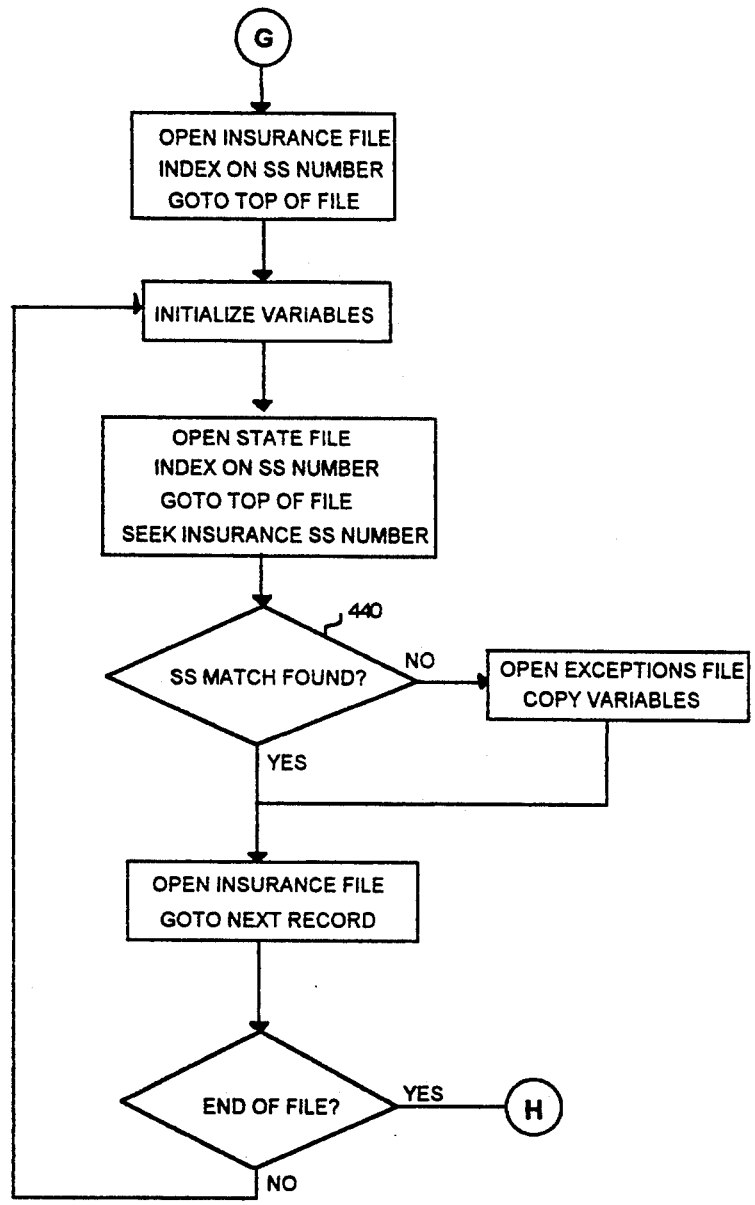
Figure 2I:
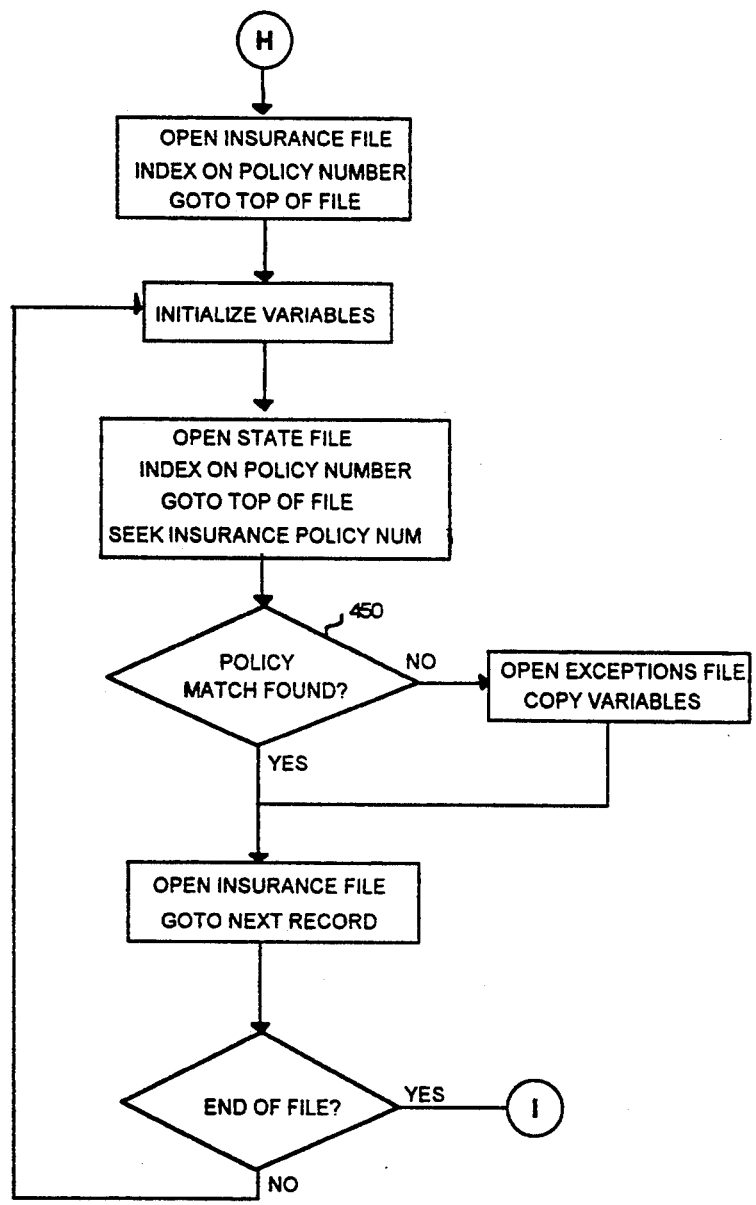
Figure 2J:
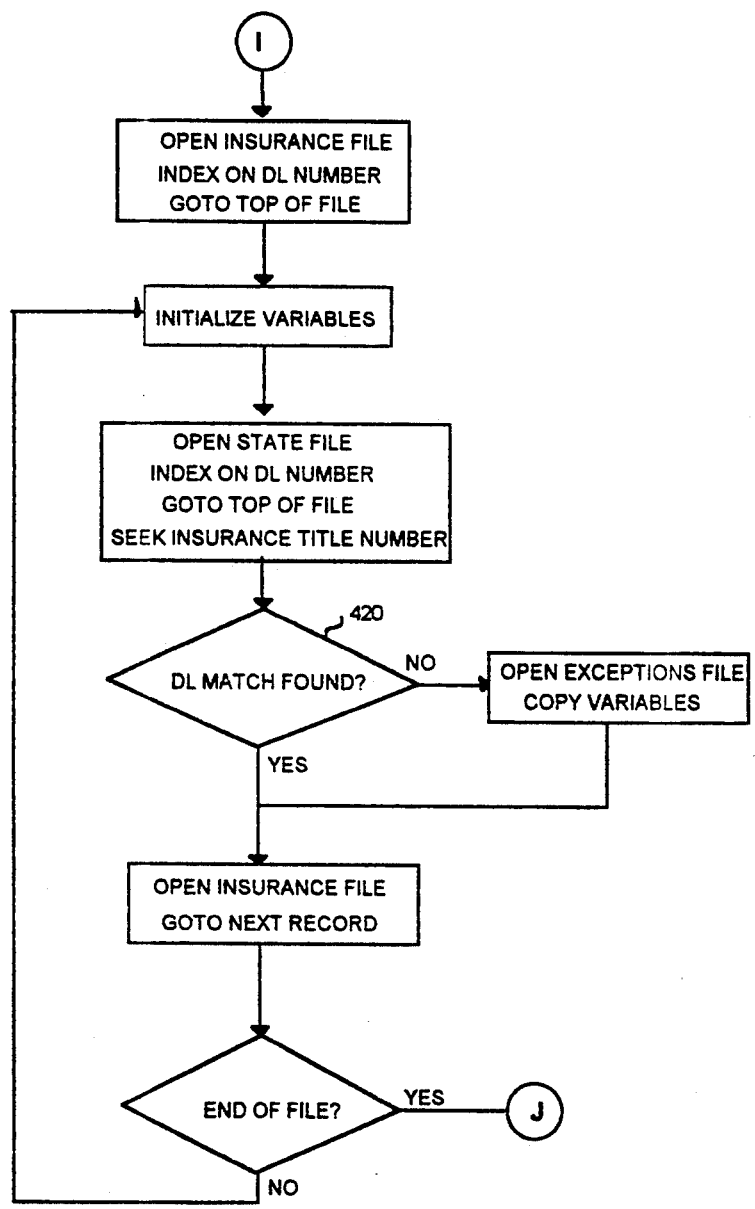
Figure 2K:
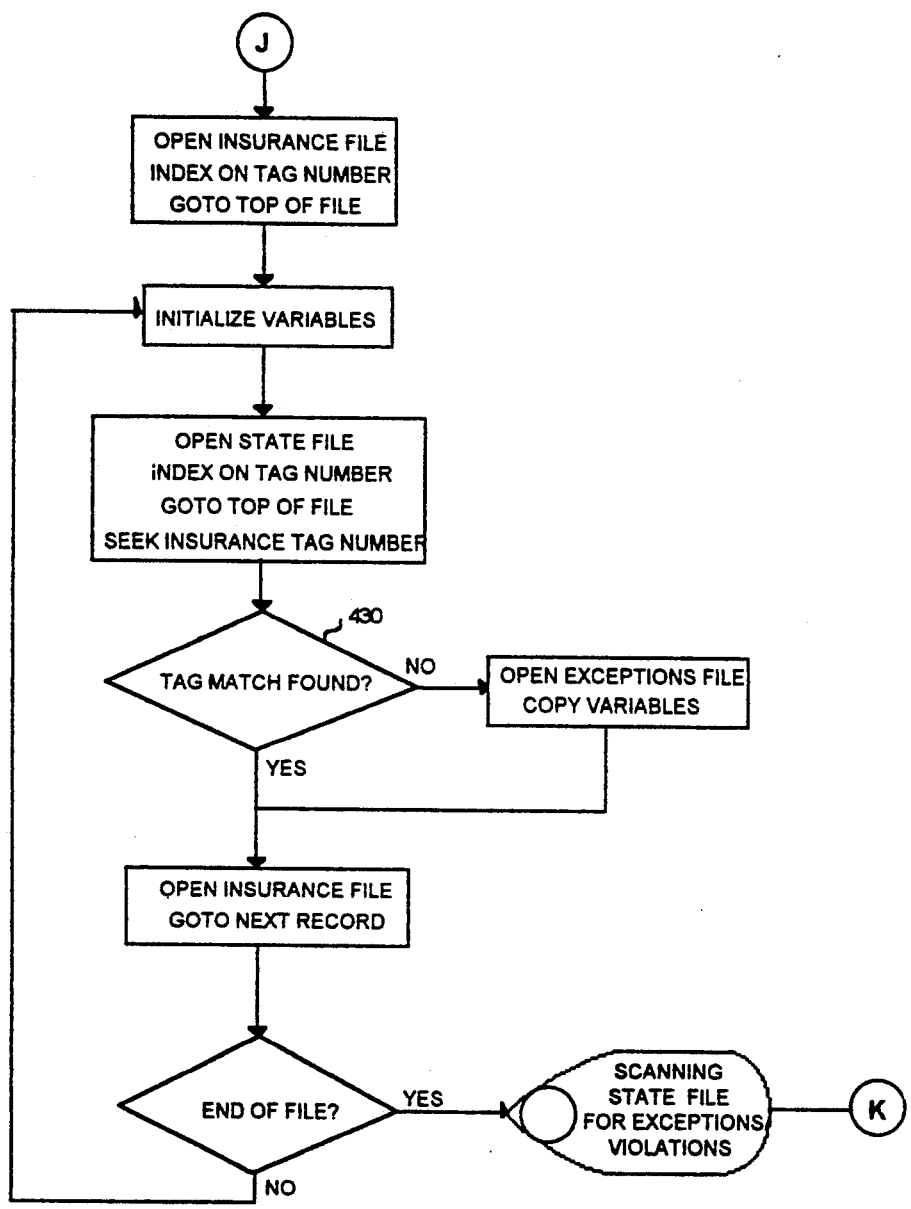
Figure 2L:
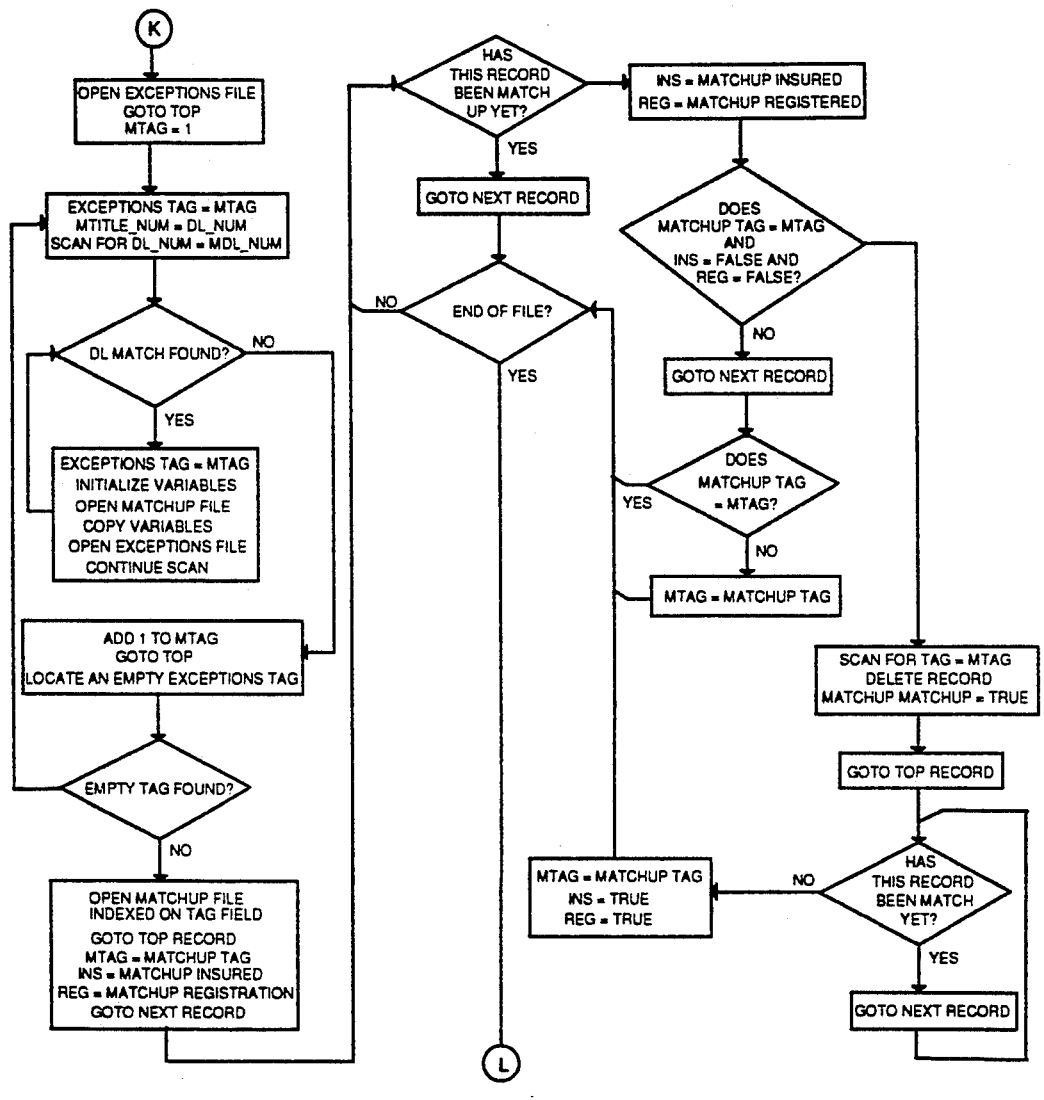
Figure 2M:
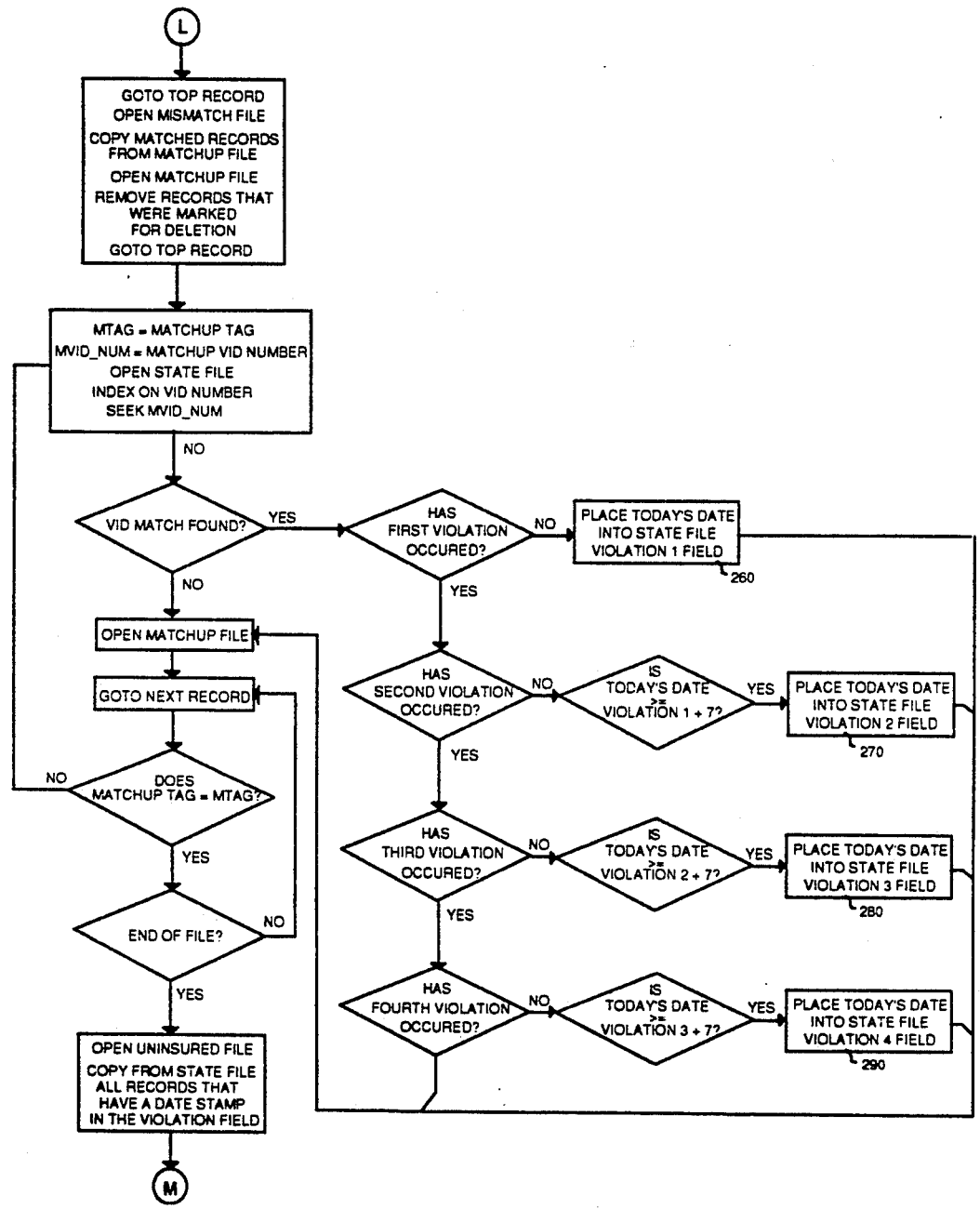
Figure 2N:
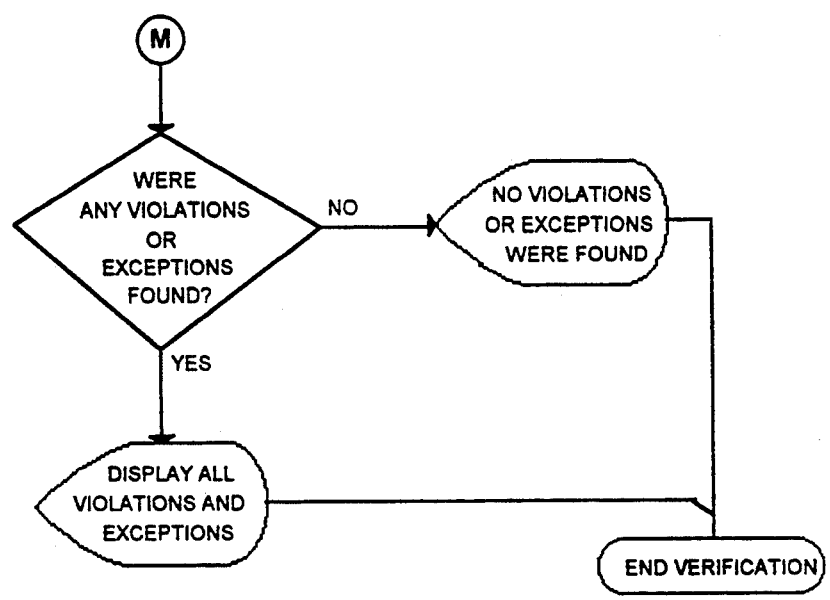

Turning more particularly to the drawings, FIGS. 2A–2N illustrates a logic flow of the insurance identification program 1000 as used as control means in the FIG. 1 computer system 2000.

FIG. 1 diagrammatically illustrates various components of the system architecture, including a State-provided database 200 having a plurality of vehicle records 201 therein each record being associated with the purchase of a license plate/tag for a particular registered vehicle. A suggested format of the vehicle record 201 is as shown in FIG. 3 with the title of each variable data field (Nos. 1-26) being acronymic in nature so as to be generally descriptive of the variable data type to be stored therein. Each State record 201 will have preselected data fields therein such as the vehicle identification number (VID) 210, the driver's license number 220, the tag number 230, the registrant's social security number 240 and insurance policy number 250. Other variable data fields associated with the vehicle or registrant may also be included as shown in FIG. 3. The State database 200 is assumed to include a record 201 for every vehicle issued a license plate/tag in that particular state. It is here noted that such record 201 includes an insurance policy number field 260 for entry by the State employee at plate purchase upon insurance verification.

A second database 400 comprises therein a plurality of insurance records 401 provided by the private sector, such as insurance companies. Each record 401 includes preselected, generally identical, data fields (fields 1-22) therein as shown in FIG. 4. Such insurance records 401 are compiled into a preselected format so as to contain data fields (1-22) similar, if not identical to the data fields in the corresponding State vehicle record 201. Thus, each vehicle record 201 should have a corresponding insurance record 401. The insurance database 400 will include records submitted by different insurance companies and will be updated periodically, preferably on a weekly basis, to reflect the additions and terminations of insurance policies on various vehicles. Thus, if an individual terminates his insurance subsequent to plate/tag purchase the insurance database 400 will reflect the same due to that record 401 being deleted therefrom by the insurance company upon notice of insurance termination.

The records 201, 401 in databases 200, 400 can be compared by computer control means in the form of a software program 1000 so that preselected comparisons can be made between the records 201, 401 in the State 200 and insurance 400 databases. Data fields are preselected from a vehicle record 201 to act as an index for comparison to similar data fields in the records 401 of the insurance database 400. I have selected the following fields as indices to be singularly compared:
1. The vehicle identification number—VID 210, 410;
2. The vehicle driver's license number 220, 420;
3. The vehicle tag number 230, 430;
4. The social security number of the vehicle owner/insured 240, 440;
5. The individual's insurance policy number 250, 450.

The State database 200 is then opened and the first record 201 is accessed. The variable data fields in this record may be copied to a separate storage or holding area. An index indicative of the data to be compared in the insurance database 400 is set with the selected data field, e.g. the VID number 210 of the accessed record 201. The insurance database 400 is then opened. The index containing the VID number 210 of the record 201 in issue in the State database 200 is compared to the appropriate VID field 410 of each record 401 in the insurance database 460. If no match is found an exception database 600 is opened. The data of the record 201 at issue is then moved from the storage/holding area to this exceptions database 600. The rID data field 210 is then flagged in the record 201. This flag will indicate upon subsequent user recall that no match was found for the VID number in the insurance database. Such an indication may result in a message displayed to the user at the user terminal screen 1500.

The next record 201' in the State database is selected and the above VID number 210 comparison process is repeated until all records 201 in the State database 200 have been so compared. The exceptions database 600 will now contain State records 201 having a VID number 210 for which no insurance database 400 record 401 containing a matching VID number 410 was found.

The State database 200 to insurance database 400 comparison can then be repeated for other preselected data fields as further checks for accuracy of the information contained in the variable data fields of the records 201 in the State database 200. For example, the social security number 240 can be indexed and subsequently checked for a match in the records 401 of the insurance database. Subsequently, the insurance policy number 250, driver's license number 220 and vehicle tag number 230 can be likewise compared. If no match is found for any of these data fields in the insurance records 401 database 400 the appropriate field in the record 201 can be flagged which will indicate to a user the reason for its presence in the exceptions database 600. Again, the flagged field can cause an appropriate message to be printed at the terminal 1500.

After the entire comparison process is completed, i.e. verification of the preselected data fields in each record 201 of the State database 200 to the insurance database 400 records 401, the verification process is repeated for the same data fields 410, 440, 450, 420, 430 from the insurance database 400 to the State database 200. If no match is found a copy of the insurance record 401 in question is moved to the exceptions database 600 with an appropriate field marked to indicate the reasons for the appearance of the record 401 in the exceptions database 600. Again, the flagging of the particular filed inquestion can cause a message to be displayed to the user on the terminal 1500.

Once the above cross-verification has been completed the various records stored in the exceptions database 600 are then analyzed. A counter is set to one. An index is set to the driver's license number appearing in the first record of the exceptions database 600. The balance of the database 600 is searched for any duplicate driver's license number. For each record found containing the driver's license number an identical counter number is then placed into an I.D. number field of that exceptions database record. On completion of the scan for a particular driver's license number the counter is increased by one. The above comparison is then repeated for the next record driver's license number.

Once all the records in the exception database 600 are filled with counter numbers, the I.D. field numbers in the match-up database are checked. If a match among identification numbers is found the records in the database 600 are checked to ascertain if the matched records are an insured 401 and State registered record 201. If so, they are copied to a mismatched database 700. The reasons for their appearance in database 700 are analyzed, corrected and then entered, if appropriate, into the appropriate database 200, 400. A State vehicle records 201 in database 600 which does not have a matching insurance record 401 in database 600 indicates that there is no comparable insurance record 401 in the database 400 for that vehicle record 201. A first violation field 260 in the State record 201 is flagged with the current date. Record 201 is then reentered into the State database 200. If no insurance is subsequently purchased, database 400 will lack a corresponding insurance record 401. Thus, upon a subsequent comparison run as above described, the same vehicle record 201 will again appear in the exceptions database 600. The second violation field 270 is filled in with the date, with reentry of record 201 into database 200. Once the violation fields 260, 270, 280, 290 are flagged with dates, normally seven days apart corresponding to the weekly comparison runs, the vehicle is considered not insured. This action allows for any reasonable time delays in updating the insurance database 400 with records 401. The State record 201 may be entered into an uninsured file 800 for further downstream processing so that appropriate authorities can be notified for vehicle tag recall.

It is understood that other records may appear in the exceptions database 600 which may not be attributable to the lack of insurance. Thus, the records 201, 401 may have been flagged for no matching driver's license number, tag number, social security numbers or the like in either database due to data entry errors. Thus, the appropriate records can be pulled for administrative handling and correction if desired or required and reentered into the system.

Accordingly, the above system provides a method for ascertaining the presence or absence of insurance on vehicles. Also, the system allows for further accuracy checks to be made between the two databases 200, 400. Moreover, it is understood that once the above system is implemented various modifications may be employed so as to check other types of record information.

Figure 5:
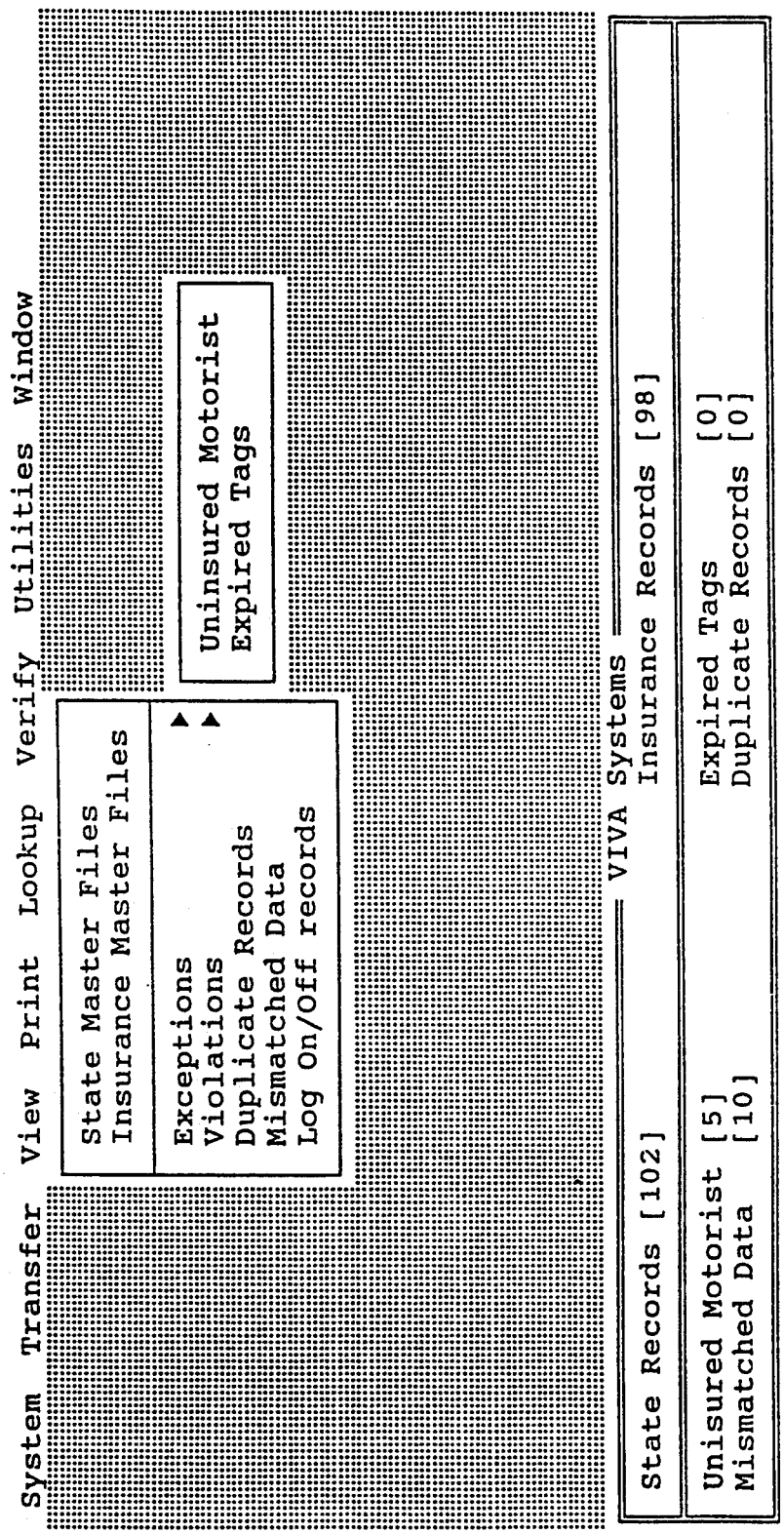
FIG. 5 is a layout of a user interface screen displayed on the terminal allowing the user to select records for viewing.

It is also understood that during processing various screens may be presented to the user on terminal 1500. Such screens may give to the user information as to the results of the above comparisons such as the number of insurance and vehicle records checked, the number and type of mismatches and the records found therein. The user will be allowed to view such records. One type of interface screen is as shown in FIG. 5. The record viewed may be in a format as shown in FIG. 6. Once the above information is gathered it may be further processed such as shown in FIG. 7. Other screens may be utilized according to the desires of the user.

It is to be understood that while one form of this invention has been illustrated and described, it is not limited thereto except insofar as such limitations are included in the following claims and allowable functional equivalents thereof.

Having thus described the invention what is claimed as new and desired to be secured by Letters Patent is as follows:

1. A computer implemented method of operation for determining the presence or absence of insurance on a registered vehicle comprising the steps of:
   a. encoding first input data into vehicle records indicative of registered vehicles;
   b. storing said vehicle records into a vehicle database;
   c. selecting at least one portion of each vehicle record for use as an index key;
   d. encoding second input data into insurance records indicative of insurace in force on vehicles;
   e. storing said insuracne records into an insurance database;
   f. selecting at least one portion of each insurance record for use as an index key corresponding to said selected index key in said vehicle record;
   g. selecting said index key from a selected vehicle record in said vehicle database;
   h. matching said index key of said selected vehicle record in said vehicle database with said corresponding index key in each insurance record in said insurance database;
   i. copying from said vehicle database said selected vehicle record into a third database if no index key match is found in step h;
   j. repeating steps g-i for all vehicle records in said vehicle database;
   k. displaying said records in said third database, said records indicative of selected vehicle records having no corresponding record in said insurance database for said selected index key.

2. The method as claimed in claim 1 further comprising the steps of:
   l. selecting said corresponding index key from a selected insurance record in said insurance database;
   m. matching said index key of said selected insurance record in said insurance database with said corresponding index key in each vehicle record in said vehicle database;
   n. copying from said insurance database said selected insurance record into said third database if no index key match is found in step m;
   o. repeating steps l-n for all insurance records in said insurance database;
   p. displaying said records in said third database, said records indicative of insurance records having no corresponding records in said vehicle database for said selected index key.

3. The method as claimed in claim 2 further comprising prior to said step of displaying said records the steps of:
   1. comparing a selected index key of each record in said third database to a corresponding index key of each other record in said third database;
   2. for each record having a matching index key in step 1 determining whether the records are from the vehicle and insurance databases respectively;
   3. moving said vehicle and insurance records having a matching index key to a fourth database for updating and replacement into said respective vehicle and insurance databases, said remaining records in said third database available for said subsequent step of displaying said records.

4. The method as claimed in claim 1 further comprising the step of:
   flagging each vehicle record copied to said third database in a manner to indicate said portion of said vehicle record selected as said index key;
   associating said flag with a legend indicative of the reason for said vehicle record in said third database;
   displaying said legend concurrent with said step of displaying said flagged vehicle records in said third database.

5. The method as claimed in claim 2 further comprising the step of:
   flagging each insurance record copied to said third database in a manner to indicate said portion of said second insurance records selected as said corresponding index key for matching with said corresponding index key in each vehicle record;
   associating said flag with a legend indicative of the reason for said insurance record in said third database;
   displaying said legend concurrent with said step of displaying said flagged insurance records in said third database.

6. The method as claimed in claim 1 wherein said selected index key from said vehicle record is a driver's license number of the vehicle.

7. The method as claimed in claim 1 wherein said selected index key from said vehicle record is a vehicle identification number.

8. The method as claimed in claim 1 wherein said selected index key from said vehicle record is a license plate number.

9. The method as claimed in claim 1 wherein said selected index key from said vehicle record is a social security number of a vehicle owner.

10. The method as claimed in claim 1 further comprising:
   repeating the steps a–j for a predetermined number of times prior to performing said step k of displaying said vehicle records in said third database;
   updating said insurance records in said insurance database after each performance of said steps a–j;
   performing said step k of displaying said vehicle records after said updating step is performed.

11. The method as claimed in claim 1 wherein said selected index key from said insurance database record is a driver's license number of the vehicle.

12. The method as claimed in claim 1 wherein said selected index key from said insurance database record is a vehicle identification number.

13. The method as claimed in claim 1 wherein said selected index key from said insurance database record is a license plate number.

14. The method as claimed in claim 1 wherein said selected index key from said insurance database record is a social security number of a vehicle owner.

15. A method for determining the existence of insurance coverage on a particular vehicle comprising the steps of:
   a. providing a database of data records corresponding to vehicles registered with a particular State;
   b. providing a second database of data records of all insurance policies written within the State for vehicles;
   c. selecting a data field from a desired vehicle record in said State database;
   d. comparing said data field to a corresponding data field in each record in said insurance database;
   e. copying said recording from said State database into a third database if no comparable insurance database record is found with said compared data field therein;
   f. performing steps c–e for each vehicle record in said State database;
   g. selecting a data field from a desired insurance record in said insurance database, said data field corresponding to the selected data field in step c;
   h. comparing said data field to a corresponding data field in each vehicle record in said vehicle database;
   i. copying said record from said insurance database into said third database if no comparable State database record is found with said compared data field therein;
   j. performing steps g–i for each record in said insurance database:
   k. matching vehicle records in said third database from said State database with a corresponding insurance record in said third database;
   l. moving said matched vehicle and insurance records to a fourth database;
   m. flagging the remaining vehicle records in said third database to indicate said vehicle record has been previously found to have no matching record in the insurance database;
   n. updating the second database with subsequent insurance records indicative of insurance policies in existence within the State for vehicles;
   o. subsequently comparing said selected data field in each flagged vehicle record to said updated insurance database records;
   p. moving the vehicle records of step o having no matching record in the insurance database to an uninsured vehicle file for further administrative handling, said vehicle records indicative of registered vehicles with no insurance in force thereon.

16. A computer implemented method of operation for determining the presence or absence of insurance on a registered vehicle comprising the steps of:
   a. encoding first input data into vehicle records indicative of registered vehicles;
   b. storing said vehicle records into a vehicle database;
   c. selecting at least one portion of each vehicle record for use as an index key;
   d. encoding second input data into insurance records indicative of insurance in force on vehicles;
   e. storing said insurance records into an insurance database;
   f. selecting at least one portion of each insurance record for use as an index key corresponding to said selected index key in said vehicle record;
   g. selecting said index key from a selected vehicle record in said vehicle database;
   h. matching said index key of said selected vehicle record in said vehicle database with said corresponding index key in each insurance record in said insurance database;
   i. flagging said selected vehicle record if no index key match is found in step h;
   j. repeating steps g–i for all vehicle records in said vehicle database;
   k. moving said flagged vehicle records to an uninsured vehicle file for further administrative handling, said flagged records indicative of selected vehicle records having no corresponding insurance record in said insurance database for said selected index key.

17. The method as claimed in claim 16 further comprising the steps of:
   l. selecting said corresponding index key from a selected insurance record in said insurance database;
   m. matching said index key of said selected insurance record in said insurance database with said corresponding index key in each vehicle record in said vehicle database;
   n. flagging said selected insurance record if no index key match is found in step m;
   o. repeating steps l–n for all insurance records in said insurance database;
   p. moving said flagged insurance records to an insurance file for further administrative handling, said flagged records indicative of insurance records having no corresponding vehicle record in said vehicle database for said corresponding index key.

18. The method as claimed in claim 17 further comprising, prior to the step of moving said records, the steps of:
   1. comparing a selected index key of each flagged record in said vehicle database to a corresponding index key of each flagged record in said insurance database;
   2. for each record having a matching index key in step 1, moving said vehicle and insurance records to a separate database;
   3. analyzing each record to ascertain the reason for said flagging;

4. correcting each record;
5. replacing each corrected record in said respective vehicle or insurance databases.

19. The method as claimed in claim 18 further comprising the steps of:

associating said flag with a legend indicative of the reason for flagging said record;

displaying said legend concurrent with displaying said respective record.

* * * * *

UNITED STATES PATENT AND TRADEMARK OFFICE
CERTIFICATE OF CORRECTION

PATENT NO. : 5,325,291
DATED : June 28, 1994
INVENTOR(S) : THOMAS L. GARRETT and MICHAEL TUTTLE It is certified that error appears in the above-indentified patent and that said Letters Patent is hereby corrected as shown below:

Column 5, line 51, delete "insuracne" and substitute --insurance-- therefor.

Signed and Sealed this

Sixth Day of September, 1994

Attest:

BRUCE LEHMAN

*Attesting Officer*    *Commissioner of Patents and Trademarks*